US00RE38249E

(19) United States
(12) Reissued Patent
Tasson et al.

(10) Patent Number: US RE38,249 E
(45) Date of Reissued Patent: Sep. 16, 2003

(54) ROTATING BLOWOUT PREVENTER AND METHOD

(75) Inventors: Paul L. Tasson, Spring, TX (US); James D. Brugman, 17103 Wunderhill, Spring, TX (US) 77379

(73) Assignee: James D. Brugman, Houston, TX (US)

(21) Appl. No.: 09/219,475

(22) Filed: Dec. 22, 1998

Related U.S. Patent Documents

Reissue of:
(64) Patent No.: 5,588,491
Issued: Dec. 31, 1996
Appl. No.: 08/513,436
Filed: Aug. 10, 1995

(51) Int. Cl.[7] ..... E21B 33/06; E21B 33/08
(52) U.S. Cl. ..... 166/383; 166/84.3; 166/85.4; 166/387; 277/324
(58) Field of Search ..... 166/84.3, 85.4, 166/84.4, 88.4, 379, 387; 175/195; 251/1.1, 1.2; 277/324, 326

(56) References Cited

U.S. PATENT DOCUMENTS

| | | | | |
|---|---|---|---|---|
| 1,902,906 A | | 3/1933 | Seamark | |
| 2,192,805 A | | 3/1940 | Seamark | |
| 3,297,091 A | | 1/1967 | Dale | |
| 3,387,851 A | | 6/1968 | Cugini | |
| 3,472,518 A | | 10/1969 | Harlan | |
| 3,492,007 A | | 1/1970 | Jones | 277/31 |
| 3,529,835 A | | 9/1970 | Lewis | |
| 3,561,723 A | | 2/1971 | Cugini | 277/31 X |
| 3,965,987 A | | 6/1976 | Biffle | |
| 4,098,341 A | | 7/1978 | Lewis | 195/195 X |
| 4,143,880 A | | 3/1979 | Bunting et al. | |
| 4,143,881 A | | 3/1979 | Bunting | |
| 4,154,448 A | | 5/1979 | Biffle | |
| 4,208,056 A | | 6/1980 | Biffle | |
| 4,337,653 A | | 7/1982 | Chauffe | |
| 4,361,185 A | | 11/1982 | Biffle | |
| 4,367,795 A | | 1/1983 | Biffle | |
| 4,378,849 A | | 4/1983 | Wilks | 166/369 |
| 4,383,577 A | | 5/1983 | Pruitt | 166/95.1 |
| 4,441,551 A | | 4/1984 | Biffle | |
| 4,448,255 A | | 5/1984 | Shaffer et al. | |
| 4,529,210 A | | 7/1985 | Biffle | |
| 4,531,580 A | | 7/1985 | Jones | |
| 4,618,314 A | | 10/1986 | Hailey | 417/53 |
| 4,745,970 A | | 5/1988 | Bearden et al. | |
| 4,783,084 A | | 11/1988 | Biffle | |
| 5,012,854 A | * | 5/1991 | Bond | 166/84.3 X |
| 5,022,472 A | * | 6/1991 | Bailey et al. | 166/84.3 X |
| 5,178,215 A | | 1/1993 | Yenulis et al. | 251/1.1 X |
| 5,224,557 A | * | 7/1993 | Yenulis et al. | 166/84.3 X |
| 5,251,869 A | | 10/1993 | Mason | |
| 5,409,073 A | | 4/1995 | Gonzales | |

FOREIGN PATENT DOCUMENTS

GB 2067235 A 7/1981

OTHER PUBLICATIONS

Design #5; Design Concept Shown at May '94 Offshore Technology Conference, Houston, Texas.

"Product Development of Pressure Control While Drilling" Shaffer, disclosed to potential customers in the U.K. in Apr. '94.

C. W. Williams, Jr., et al: "History and Development of a Rotating Blowout Preventer," IADC/SPE 23931 (Society of Petroleum Engineers), pp. 757–773.

1970–1971 Brochure—Reagan Forge & Engineering Co., "Reagan Blowout Preventers". 3 pgs.

* cited by examiner

*Primary Examiner*—Frank Tsay
(74) *Attorney, Agent, or Firm*—Browning Bushman, P.C.

(57) ABSTRACT

The rotatable blowout preventer 10 comprises a stationary outer housing 12 and a rotatable inner housing 38 having a curved surface 42 thereon defining a portion of a sphere. An annular packer assembly 46 includes spherical packer elements for sliding engagement with the curved surface of the inner housing such that a packer assembly may seal against various sized tubulars. A lower rotary seal 98 between a piston 56 and the outer housing 12 is exposed to the differential between pressurized hydraulic fluid and the well pressure within a lower end of the bore 32 within the outer housing. A flow restriction member 114 between the rotatable inner housing and the outer housing reduces fluid pressure downstream from the flow restriction to less than 40% of the upstream pressure. The upper rotary seal 120 is open to atmospheric pressure and is subjected to this reduced pressure. Improved techniques are provided for passing hydraulic fluid through the blowout preventer for both closing and opening the sealing assembly 46.

29 Claims, 2 Drawing Sheets

ROTATING BLOWOUT PREVENTER AND METHOD

Matter enclosed in heavy brackets [ ] appears in the original patent but forms no part of this reissue specification; matter printed in italics indicates the additions made by reissue.

FIELD OF THE INVENTION

The present invention relates to blowout preventers and, more particularly, relates to a rotating blowout preventer with spherical packing elements for use in hydrocarbon recovery operation. The blowout preventer of this invention is able to reliably withstand high pressure while maintaining sealed engagement with a tubular rotating at relatively high speeds, and also may be used to seal with a non-rotating tubular.

BACKGROUND OF THE INVENTION

Rotary blowout preventers for oil well drilling operations have existed for decades. U.S. Pat. No. 3,492,007 discloses a blowout preventer (BOP) for sealing well pressure about a rotating kelly or other production tool. U.S. Pat. No. 3,561,723 discloses a blowout preventer designed to prevent fluid from escaping from the well while the pipe string is either rotating or stationary. U.S. Pat. No. 4,098,341 discloses a rotating blowout preventer which is supplied with pressurized hydraulic fluid to lubricate and cool bearings within the BOP.

U.S. Pat. No. 4,378,849 discloses a blowout preventer with a mechanically operated relief valve to release high pressure surges in the annulus between the casing and the drill pipe sealed by the BOP packing. U.S. Pat. No. 4,383,577 discloses a rotating drilling head assembly which provides for the continuous forced circulation of oil to lubricate and cool thrust bearings within the assembly. A technique for fluidly connecting an outlet port of a BOP and an inlet of a choke manifold is disclosed in U.S. Pat. No. 4,618,314. The fluid may be injected into the blowout preventer for pressure testing and for charging the equipment with a desired fluid.

U.S. Pat. No. 5,178,215 discloses a rotary blowout preventer with a replaceable sleeve having a plurality of grippers therein. The blowout preventer disclosed in the '215 patent utilizes an inner packer which is responsive to hydraulic pressure to act against a sleeve which engages the drill pipe. The hydraulic fluid pressure which causes radial movement of the inner packer is sealed within the body of the BOP by seal assemblies which must withstand a pressure differential in excess of the difference between the well pressure and atmospheric pressure.

Improvements in rotating blowout preventers are required so that the blowout preventer may reliably withstand higher pressures, such as the high pressure commonly associated with underbalanced drilling. Underbalanced drilling occurs when the hydrostatic head of the drilling fluid is potentially lower than that of the formation being drilled. Underbalanced drilling frequently facilitates increased hydrocarbon production due to reduced formation damage, and results in both reduced loss of drilling fluids and reduced risk of differential sticking.

The disadvantages of the prior art are overcome by the present invention, and an improved blowout preventer and method of operating a blowout preventer are hereinafter disclosed. The blowout preventer is able to withstand high pressure while maintaining sealed engagement with a tubular rotating at relatively high speeds, and may also be used to seal with a non-rotating tubular.

SUMMARY OF THE INVENTION

The rotating blowout preventer of the present invention may be compatible with either kelly or top drive drilling systems. The spherical sealing assembly is capable of being used to strip tubulars and oilfield tubular connections, and will reliably seal with different diameter tubulars. The seal assembly may also maintain high pressure integrity when the tubular passing through the assembly is not rotating. Further, the spherical sealing assembly may seal off a well bore when no tubular is passing through the sealing assembly.

The rotating blowout preventer (RBOP) of the present invention is capable of reliable operation when the pressure differential between the well bore and atmosphere is in excess of 2000 psi and while the tubular is rotating at speeds of up to 200 rpm. The unit may also function as a non-rotating annular BOP with working pressure of up to 5000 psi. The assembly includes the ability for a complete shutoff of the empty bore at up to 2500 psi.

The spherical sealing element is actuated in response to axial movement of a fluid pressure piston. In order to minimize the diameter of the rotating seals, no rotating seals are provided on the outside diameter of the piston when applied fluid pressure causes sealing engagement of the spherical sealing elements. The piston closing force is generated by fluid pressure acting on the relatively large cross-sectional rod area of the piston between the lower seal and an upper adapter ting seal. The comparatively small cross-sectional flange area of the piston between the upper and lower adapter ring seals is used to open the RBOP. The piston and the adapter ring rotate together, and accordingly seals between these components are non-rotating.

The RBOP assembly includes a lower rotary seal between the stationary lower housing and the inner sleeve of the rotating piston. Closing pressure from the hydraulic supply to the RBOP is maintained at a selected value above the well bore pressure, so that this lower rotary seal is only exposed to a pressure differential of this selected value, e.g., from 200 psi to 500 psi. The upper rotary seal acts between the stationary upper housing and the rotating inner housing. A significant pressure drop is achieved across a restrictive flow bushing upstream of the upper rotary seal. The restrictive bushing floats radially with the rotating inner housing to accommodate eccentricity without generating excessive friction. The piston effect of the restrictive bushing prevents fluid flow between the bushing and the stationary upper housing and then above the bushing to the fluid outlet port. The hydraulic fluid thus passes between the outside diameter of the rotating inner housing and the inside diameter of the restrictive bushing to maintain a substantially uniform gap between the bushing and the inner housing. This substantially uniform gap may be maintained by a restrictive bushing radial bearing. The pressure of the hydraulic fluid drops significantly and at a substantially constant amount across the bushing, so that pressure acting on the upper rotary seal is continually only slightly greater than atmospheric pressure. Accordingly, the elastomeric upper rotary seal reliably isolates the low pressure hydraulic fluid from the environment.

The upper rotary seal and the lower rotary seal preferably have a diameter as small as practical, and also preferably have substantially the same diameter to balance the forces acting on the rotary components of the assembly. Pressurized fluid to the RBOP is provided in a closed loop system since fluid continuously flows past the restrictive flow bushing to maintain the desired low pressure drop across the upper rotary seal. The flow path of hydraulic fluid through the RBOP when the sealing elements engage the rotating tubular is past the lower rotary seal, then radially outward of the piston and the sealing assembly, past an inner housing thrust bearing, then past the restrictive flow bushing. The thrust bearing is spaced radially outward of and axially within the same plane as the restrictive flow bushing to reduce the axial height of the RBOP. The restrictive flow bushing preferably fits between cylindrical surfaces on the stationary upper housing and the rotary inner housing which each have an axis concentric with the central axis of the RBOP.

An opening chamber is formed between the upper and lower adapter ring seals and between the adapter ring and the piston. Although no outer rotating elastomeric seals are provided on the piston, the opening pressure to the RBOP is substantially restricted from passing beneath the piston by a metal-to-metal restriction between the adapter ring and an adapter ring bearing race. Since the sealing assembly is not rotating when the RBOP is opened, this metal-to-metal restriction need only be a static restriction.

It is an object of the present invention to provide an improved rotary blowout preventer which utilizes a spherical sealing assembly. A further object of the present invention to reduce to pressure applied to the upper rotary seal of an RBOP by providing a flow restrictive member upstream of the upper rotary seal, and continuously circulating fluid past the flow restrictive member.

It is a feature of the present invention that hydraulic fluid supplied to the RBOP for actuating the sealing assembly is first directed past the lower seal assembly, then in a path radially outward of both the actuating piston and the sealing assembly, then past an inner housing thrust bearing, and finally past a restrictive member which reduces the differential pressure applied to the upper seal assembly. It is a further feature of the present invention that the thrust member is radially outward of and in substantially the same horizontal plane as the flow restrictive member to reduce the height of the RBOP. A further feature of the invention is that the flow restrictive member resides between the cylindrical surfaces each having an axis substantially concentric with a central axis of the RBOP. Still another feature of the invention is the ability to reliably open the RBOP in response to fluid pressure applied to the RBOP and without providing a dynamic elastomeric seal on the outer diameter of the piston.

It is an advantage of the present invention that the rotating blowout preventer may also reliably seal under high pressure against a non-rotating tubular passing through the RBOP. The sealing assembly of the RBOP is able to reliably seal against different sized tubular members or against a non-tubular member passing through the RBOP. The sealing assembly further has the ability for a complete shutoff of the well with no tubular passing through the RBOP. The RBOP assembly is capable of being used to strip various tubulars and oilfield tubular connections. The assembly may be used with either kelly or top drive drilling systems.

These and further objects, features, and advantages of the present invention will become apparent in the following detailed description, wherein reference is made to the figures in the accompanying drawings.

DETAILED DESCRIPTION OF THE PREFERRED EMBODIMENTS

Figure 1:
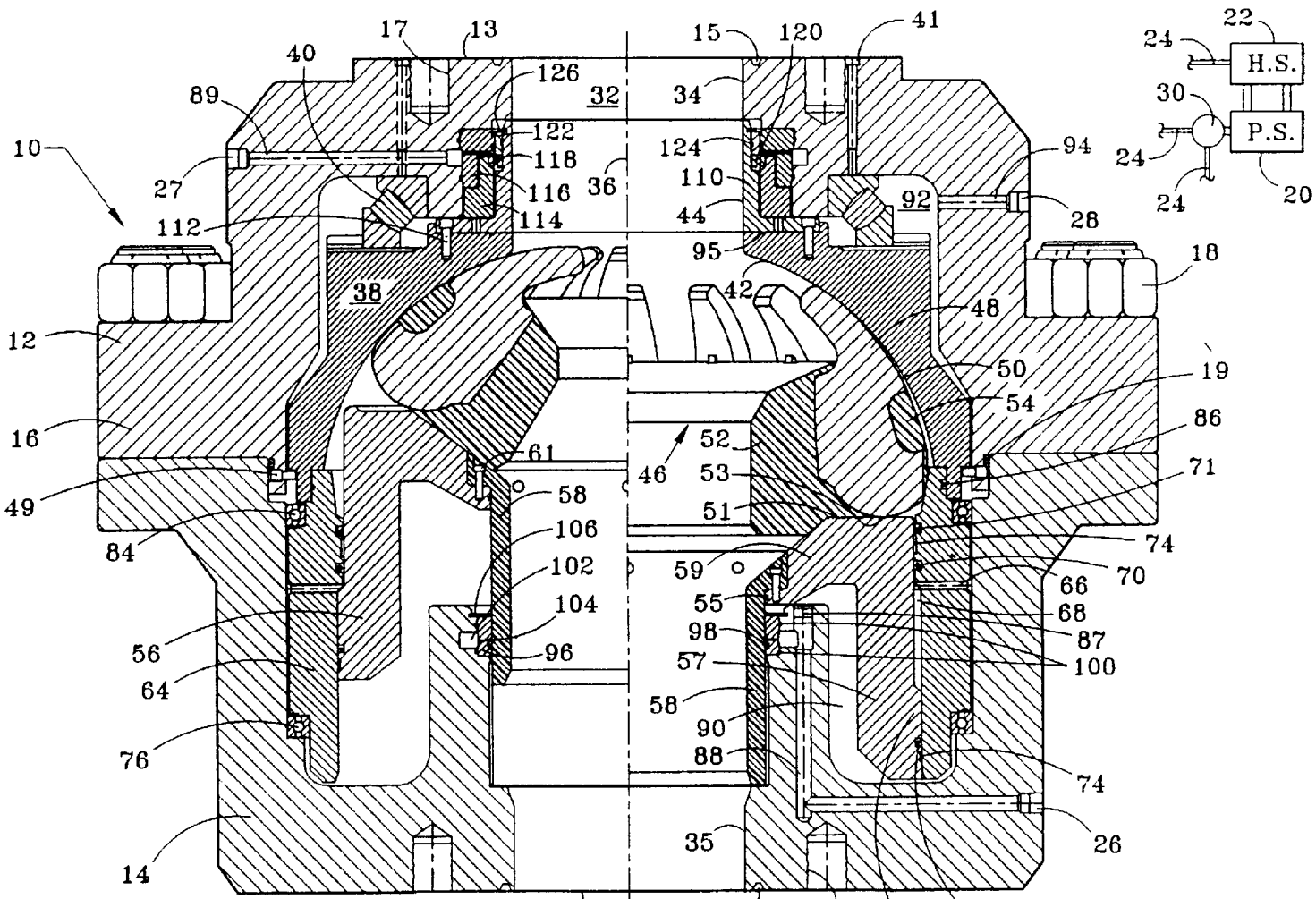
FIG. 1 is a pictorial view, partially in cross-section, of a rotating blowout preventer according to the present invention. The side right of the centerline is shown in the open position, and the side left of the centerline is shown in the closed position.

FIG. 1 depicts a rotating blowout preventer (RBOP) 10 according to the present invention. The sealing assembly of the RBOP is open on the right side of the figure, while the left side of the same figure shows the sealing assembly in the closed position for engagement with an oilfield tubular. Those skilled in the art will appreciate that the RBOP 10 of the present invention is functionally improved compared to most commercially available blowout preventers, in that the assembly is designed so that the sealing assembly discussed hereafter may remain in engagement while the tubular member is rotating within a wellbore.

Assembly 10 comprises a stationary outer housing 12, which may be formed from lower housing 14 and upper housing 16 each having mating flanges for secured engagement by conventional bolts 18. A static O-ring 19 provides sealed engagement between the stationary lower housing 14 and the upper housing 16. Opposing housing ends each include a respective planar surface 13 for sealed engagement with conventional oilfield equipment. The end of each housing is provided with a groove 15 for receiving a conventional ring gasket for sealed engagement with such equipment. A plurality of circumferentially spaced threaded ports 17 are provided for receiving conventional securing members to connect such equipment to the assembly 10. Accordingly, the assembly 10 is compatible with various types of oilfield equipment.

Those skilled in the art will appreciate that hydraulic fluid may be applied to actuate the assembly 10 as shown in FIG. 1 in a conventional manner. The pressurized fluid source 20, such as a pump, may be used to supply hydraulic fluid to the assembly 10 from a hydraulic supply or reservoir 22. Pressurized hydraulic fluid is supplied to the assembly 10 through lines 24, which interconnect the pressurized source 20 with a fluid closing port 26 in the lower housing 14, a fluid opening port 28 in the upper housing 16, and a fluid output port 27 in the upper housing 16. As explained subsequently, port 26 is the input port for hydraulic fluid when the valve 30 is positioned for closing the RBOP about a tubular member, and port 27 is an output port for returning the hydraulic fluid to the reservoir 22. Those skilled in the art will appreciate that the hydraulic system as shown in FIG. 1 may also include conventional filters and heat exchangers. Moreover, the fluid pressure supplied by the source 20 is preferably controlled in response to measured pressure in the wellbore. Accordingly, sensors, gauges, and a computer (not depicted) may be used for controlling the supply of hydraulic fluid to the assembly 10.

The stationary housing 10 defines a cylindrical bore 32 through the RBOP, which determines the maximum size of the tubular which may be used for a particular assembly 10.

The upper and lower inner cylindrical walls 34 and 35 of the housing 12 thus determine the nominal diameter of the RBOP. The housing 12 thus may define a vertical centerline 36 which is coaxial with the centerline of the tubular passing through the RBOP.

The assembly 10 also includes a rotatable inner housing 38 which is rotatably guided by a large thrust bearing 40. Bearing 40 has its upper race in engagement with the stationary housing 12, and its lower race in engagement with the rotatable inner housing 38. The upper race of the bearing 40 is retained in place by an interference fit. Port 41 in the housing 16 is provided for applying pressure to the upper race during disassembly for breaking the interference fit connection between the bearing 40 and the housing 16. The cylindrical inner surface 44 of the inner housing sleeve has a diameter equal to or slightly more than the diameter of cylindrical surface 34 on the stationary housing. The rotatable inner housing includes a curved surface 42, which curved surface is formed by a portion of a sphere having a center on or substantially adjacent the centerline 36.

A sealing assembly 46 is provided within rotatable inner housing 38, and includes a plurality of circumferentially arranged metal elements 48 and an annular elastomeric sealing element 52. Pins 49 keep the inner housing 38 within the upper housing 16 during assembly of the upper and lower housings, thereby retaining in place the bearings and seals between the inner housing 38 and the upper housing 16. Each of the metal elements 48 has a curved outer surface 50 for sliding engagement with the similarly configured curved surface 42 on the inner housing as explained hereafter. Annular elastomeric element 52 provides for sealing engagement with the tubular, while the outer annular elastomeric element 54 provides sealing engagement between the metal elements 48 and the rotatable inner housing 38.

It is a particular feature of the present invention that the RBOP be provided with a spherical sealing assembly, i.e., a sealing assembly adapted for sliding engagement with a spherical surface on the rotatable inner housing. Spherical sealing assemblies of the type generally shown in FIG. 1 have been reliably used for years in non-rotating blowout preventers, and have advantages over other types of sealing assemblies. Sealing assembly 46 as shown in FIG. 1 may maintain high pressure sealing integrity with various diameter tubulars passing through the assembly, and may also seal with non-cylindrical members. Assembly 10 according to the present invention is thus compatible with either kelly or top drive drilling systems, and is capable of being used to strip various tubulars and oilfield tubular connections. Spherical sealing assembly 46 also has the ability for complete shutoff of the well with no tubular passing through the RBOP.

The assembly 10 includes an axially movable piston 56 which comprises a radially outward sleeve-shaped ring member 57, a radially inner sleeve-shaped ring member 58, and an upper collar 59 interconnecting the ring members 57 and 58. For manufacturing purposes, the collar 59 and the outer ring member 57 may be formed as one component, which may be interconnected with the inner ring member 58 by conventional cap screws 61. A static seal 55 seals between the outer ring member 57 and the collar 59. An upper supporting surface 51 on the piston 56 is designed for engagement with the lower surface 53 of the metal elements 48. Accordingly, axial movement of the piston 56 causes corresponding axial and radial movement of the sealing assembly, thereby controlling the closing and opening of the RBOP on a tubular.

A lower flange 62 on the piston 56 is provided with a elastomeric seal 72 for sealing engagement with adapter ring 64. Fluid passageway 66 through the adapter ring 64 provides continuous fluid communication between opening chamber 68 and an annular gap between a radially exterior surface of the adapter ring and an interior surface of the housing 12, as discussed subsequently. Another elastomeric seal 70 and a backup U-cup elastomeric seal 71 provide sealing engagement between an upper end of the adapter ring 64 and the piston 56. The spacing between the piston 56 and the adapter ring 64, and between the seals 70 and 72, thus define the opening chamber 68. Upper and lower wear bands 74 may be provided to centralize the piston 56 within the adapter ring 64, and to minimize sliding friction when the piston is moved axially within the adapter ring.

When the sealing assembly 46 is rotating in sealed engagement with a tubular, the piston 56 and the adapter ring 64 are also rotating members. The adapter ring is guided with respect to the outer housing 12 by a lower bearing 76 and an upper bearing 84. When closing the sealing assembly 46, pressurized fluid passes through port 26 and through passageway 88 in the lower housing element 14, and then past the seal cartridge 96 discussed subsequently and into the chamber 90 between the radially outer and radially inner ring members 57, 58 and beneath collar 59 of the piston. As shown on the left side of FIG. 1, pressurized fluid flows under radially outer ring member 57 of the piston 56, through the bearing 76, then up the annular gap between the adapter ring 64 and the outer housing element 14. Pressurized fluid continues to flow past the bearing 84, then through a gap provided between an outer surface of the rotatable inner housing 38 and an inner surface of the upper housing 16. Sealed engagement between the piston 56 and the adapter ring 64 is provided by the seals 70, 74 and 71, and sealed engagement between the adapter ring and the inner housing is provided by elastomeric seal 86. Pressurized fluid thus fills the chamber 92 surrounding the thrust bearing 40, then flows past the flow restriction 114, past the upper seal cartridge 116, out the port 27, then back to the reservoir 22.

Sealed engagement between the piston 56 and the lower housing element 14 is provided by seal cartridge 96 which includes seal 98. A suitable lower rotating seal 98 is an elastomeric rotary seal manufactured by Kalsi Engineering. Fluid pressure to the rotating BOP is preferably controlled in response to sensed fluid pressure in the wellbore, which corresponds to the fluid pressure beneath the cartridge 96 and between the piston 56 and the lower housing 14. Hydraulic fluid pressure to the RBOP is preferably maintained in the range of from about 200 psi to 500 psi greater than wellbore pressure, and accordingly only this limited pressure differential exists across the seal 98.

The upper end of the flow passageway 88 is closed off with plug 87, so that pressurized fluid must flow from the passageway 88 into the annular cavity 102, then through passageways 104 provided in the seal cartridge 96. Pressurized fluid then flows upward in an annular gap between the inner piston ring 58 and the seal cartridge 96, then into the cavity 90. Seal cartridge 96 does not rotate with the piston, and accordingly static seals 100 seal between the cartridge 96 and the lower housing element 14. Spiral retainer ring 106 may be used to removably interconnect the seal cartridge 96 with the lower housing element 14.

High pressure hydraulic fluid within the cavity 92 in the upper housing 16 is reduced to a low pressure fluid by the restriction member 114, which as shown in FIG. 1 comprises a fluid restriction bushing. As more clearly shown in FIG. 2, pressurized fluid from the cavity 92 acts on the lower surface of the bushing 114. Seal 95 provides a static seal between the inner housing sleeve 110 and the main body of the inner housing 38. These components may be secured together by a plurality of conventional bolts 112. The upper seal cartridge 116 is provided with a seal 120 similar to seal 98 previously discussed. Jacking holes 93 are provided to assist in disassembly.

Pressurized fluid acting on the bushing 114 causes a bearing race support surface 130 on the bushing to engage to radially outer race 117 on the bearing 118, forcing the bearing race 117 into metal-to-metal engagement with surface 132 on seal cartridge 116. At least substantial sealing of the sandwiched outer bearing race causes fluid to flow in the annular gap between a radially inner cylindrical surface 134 on the bushing and a radially outer cylindrical surface 136 on the inner housing sleeve 110. Bearing 118 rotatably guides bushing 114 with respect to the inner housing sleeve 110. Pressurized fluid is substantially restricted by the bushing 114. According to the present invention, the restrictive bushing 114 causes a significant pressure drop across the bushing, such that the pressure downstream of the bushing is less than 40% of the pressure upstream of the bushing. More preferably, the pressure drop across the bushing 114 is such that the pressure downstream from the bushing is from 10% to 20% of the pressure upstream from the restrictive bushing. This lower pressure fluid then flows through the passageway 119 provided in the cartridge 116, then trough the passageway 89 in the upper housing 16 and out the port 27. The replaceable sleeve member 122 is secured to the inner housing sleeve 110 by retaining ring 126, and a static seal 124 provides sealed engagement between the inner housing sleeve 110 and sleeve member 122. Upper and lower static seals 101 seal between cartridge 116 and the upper housing element 16.

A particular feature of the present invention is that the piston 96 is not provided with rotating seals on the outside diameter of the piston, so that no large diameter rotating seals are required to cause pressurized fluid to actuate the sealing assembly 46 and engage the tubular. The diameter of each of the lower rotating seal element 98 and the upper rotating seal element 120 is minimized. Each rotating seal has a nominal diameter less than 20% greater than the diameter of the bore 32 through the BOP, and preferably less than 10% greater than the diameter of the bore 32. A large closing force is generated by the sizable rod area of the piston 56, which is the horizontal cross-sectional area between the seal 98 and the seal 70. A comparatively small flange area of the piston, which is the horizontal cross-sectional area between the seal 70 and the seal 72, is used to open the sealing assembly, as explained subsequently.

During rotation of the seal assembly 46, the restrictive bushing 114 floats radially with the inner housing sleeve 110 to accommodate eccentricity without generating excessive friction. The restrictive bushing 114 is thus structurally interconnected with the rotatable inner housing sleeve 110 by the bearing 118, so that a uniform gap is maintained between the outer cylindrical surface on the inner housing and the inner cylindrical surface on the restrictive bushing. Eccentricity between the rotatable inner housing sleeve 110 and the outer housing 12 will thus not cause a variation in the radial spacing between the outer cylindrical surface 134 on the bushing 114 and the inner cylindrical surface 136 on the inner housing 38. The restriction bushing 114 is fabricated from a rigid material, such as steel, bronze or a durable ceramic. Restrictive bushing 114 preferably fits between cylindrical surfaces on the stationary upper housing and the rotating inner housing which are each substantially concentric with the central axis of the RBOP. This design is preferred compared to providing a restrictive bushing between spaced substantially horizontal surfaces on the upper housing 16 and the rotatable inner housing 38.

The void above the seal 120 and in the annulus between the tubular T and the cylindrical surface 34 on the upper housing 16 will typically be open to atmospheric pressure. Preferably, restrictive bushing 114 drops the pressure exposed to the seal 120 such that pressure downstream from the bushing 114 is in a range from 100 psi to 500 psi above atmospheric pressure. This pressure may be reliably maintained by the seal 120 over a relatively long service life of the RBOP. The seal cartridges 116 and 96 may be easily replaced during periodic service on the BOP, if required. Each rotating seal 98 and 120 is mounted on a metal seal cartridge ring which includes radial passageways therethrough for transmitting hydraulic fluid past the seal cartridge.

It may be seen that the diameter of the upper rotating seal 120 is preferably substantially the same as the diameter of the lower rotating seal 98 so as to balance the pressure acting on the rotating assembly. When the sealing assembly 46 is in sealed engagement with a rotating tubular, the inner housing 38, the adapter ring 64 and the piston 56 thus rotate as an assembly. The thrust bearing 40 opposes the upward force from the piston 56 acting against the rotating inner housing 38 through the sealing assembly 46. To reduce the size of the assembly 10, the thrust bearing 40 is preferably spaced radially outward of the flow restriction member 114. The inner housing thrust bearing 40 is also provided within a horizontal plane which is inclusive of the flow restriction member, thereby reducing the height of the RBOP.

To open the sealing assembly 46, pressurized fluid is supplied through lines 24 to the fluid opening port 28, then through passageway 94 and into chamber 92. During opening, the fluid control system blocks fluid from flowing out port 27. The hydraulic fluid will flow in the annulus between the inner housing 38 and the upper housing 16, then down the annulus between the adapter ring 64 and the lower housing 14. Pressurized fluid in the cavity 92 acting on the inner housing 38 forces the inner housing downward, which also forces the adapter ring 64 downward. This axial movement of the adapter ring is relatively small, e.g., from "0.010 to 0.050", although this movement is important as explained below.

Figure 3:
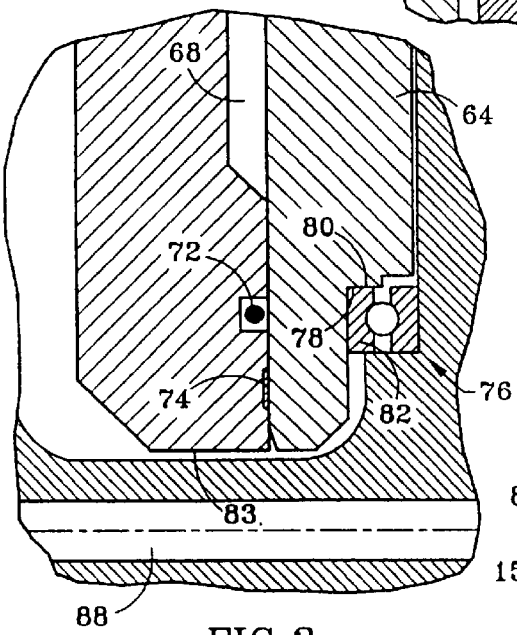
FIG. 3 is a detailed cross-sectional view illustrating the position of the adapter ring relative to the lower ball beating when the RBOP is in the open-position.

As shown in FIG. 3, pressurized fluid in fluid open port 28 forces a lower surface 78 on the adapter ring 64 into engagement with an upper surface 80 on the inner race 82 of the bearing 76, thereby substantially restricting fluid flow past the bearing 76. When opening the BOP, the inner housing 38, the adapter ring 64 and the piston 96 are not rotating, so that engagement of the surfaces 78 and 80 is static. Accordingly, pressure in the cavity 90 is significantly lower than the pressure in the cavity 92 during opening of the BOP. Fluid which flows past the bearing 76 then flows in the gap between the lower housing element 14 and a lower surface 83 on the piston, then past the inner rotating lower seal 98 and out the [pert] *port* 26.

When pressurized fluid is supplied to [pert] *port* 28 to open the RBOP, high frictional forces are not encountered within the assembly 10. It should be understood that when closing pressure is supplied to the RBOP through port 26, the adapter ring 64 is forced upward slightly into engagement with the rotating inner housing 38, thereby separating the surface 78 and 80 so that fluid flows freely up into cavity 92.

Figure 2:
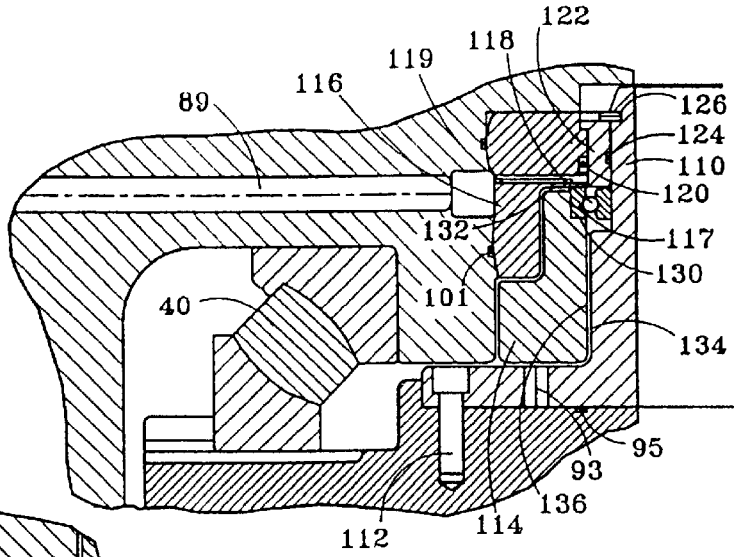
FIG. 2 is a detailed cross-sectional view illustrating one embodiment of a fluid restrictive member and an upper rotary sealing element as shown in FIG. 1 when the RBOP is in the closed position.
Figure 4:
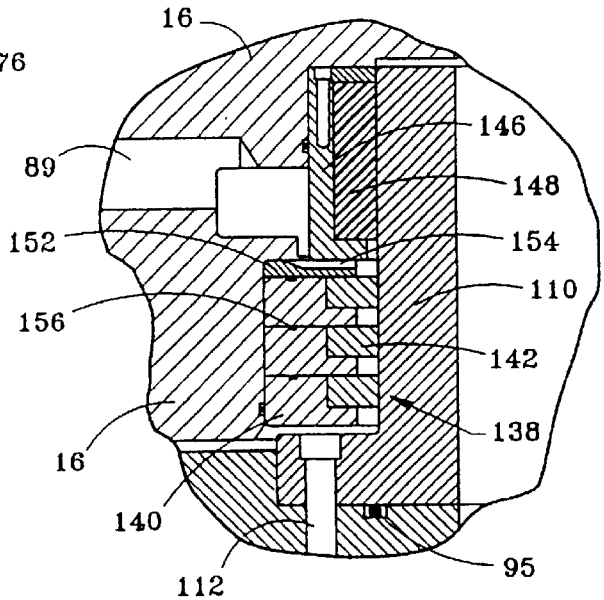
FIG. 4 is a detailed cross-sectional view illustrating an alternative embodiment of a fluid restrictive member and an upper rotary sealing element when the RBOP is in the closed position.

FIG. 4 depicts an alternative embodiment of a flow restriction member and an upper rotary seal. The embodiment as shown in FIG. 4 is similar to the embodiment as shown in FIG. 2, and accordingly like reference numerals are used to depict like components. As shown in FIG. 4, the flow restrictive bushing has been replaced with a plurality of labyrinth rings. The flow restriction member 138 comprises a plurality of axially spaced static carrier rings 140 each supporting a metal flow restriction ring 142 thereon. The rings 142 significantly reduce the pressure drop across the flow restriction member 138. A top ring 152 includes circumferentially spaced flow ports 154 for passing restricted fluid to passageway 89. Static seals 156 seal between the [carder] *carrier* rings 140. Carrier rings 140 remain in a fixed position relative to the upper housing 16, while the rings 142 each move radially with respect to the carrier rings to float and thereby accommodate eccentricity between the stationary housing 16 and the rotatable inner housing sleeve 110. The rings 142 preferably are fabricated from bronze, although steel or ceramic material rings may be used. The restricted pressure fluid in the passageways 154 then flows past the cartridge seal 146 then out the passageway 89 as previously described. The upper cartridge seal 146 includes an elastomeric sealing member 148 which seals the restricted pressure fluid from atmospheric pressure.

The rotating blowout preventer of the present invention may be used to provide reliable sealing engagement with a tubular within a wellbore having a pressure in excess of approximately 2000 psi while the tubular is rotating at speeds of up to approximately 200 rpm. A BOP capable of such reliable operation has long been desired by those skilled in the art. When the tubular is not rotating, assembly 46 may reliable seal with a tubular when the wellbore pressure is in excess of 5000 psi. As previously noted, the assembly 10 also has the ability for complete shutoff from the wellbore when no tubular is passing through the RBOP and the wellbore is at a pressure of up to 2500 psi.

According to the method of the invention, the lower rotary seal between the piston and the lower housing seals the differential pressure between the supplied hydraulic fluid pressure and the pressure in the well. As noted above, the hydraulic pressure may be controlled by conventional techniques so that this pressure differential is less than 500 psi. To seal between the rotating inner housing and the upper stationary housing, this hydraulic pressure is significantly reduced by at least 60%, so that the upper rotary seal is exposed to less than 40% of the pressure supplied to the lower rotating seals. The flow restriction is guided to maintain a substantially uniform gap between a radially inward surface of the flow restriction and a radially outward surface of the rotatable inner housing. The inner housing bearing is also positioned to reduce the size of the assembly, as explained above.

While the [beating] *bearing* 118 is preferred for maintaining a uniform gap between the flow restriction member and the rotatable inner housing, a spacing member other than a bearing could be used to maintain this uniform gap and thereby compensate for limited eccentricity between the rotatable inner housing and the stationary housing. While a fluid-tight seal between an upper surface of the flow restriction member and the upper seal cartridge is not essential, it is important that substantially all the hydraulic fluid passing by the flow restriction member pass through this uniform gap maintained by the bearing 118 or other suitable spacing member. This [fluid-fight] *fluid-tight* seal between the flow restriction member and the upper seal cartridge may be made directly, i.e., without sandwiching the bearing race therebetween.

Those skilled in the art will also appreciate that some type of fluid restriction other than the engagement of surfaces 78 and 80 on the adapter ring 64 and the bearing 76 may be used to create pressure in the opening chamber 68 which is greater than the pressure in chamber 90 when fluid pressure is applied to open the RBOP. The techniques as disclosed herein are relatively simple, however, and are considered highly reliable.

Various further modifications in the assembly 10 may be made. For example, the [ranged] *flanged* connection between the upper and lower housings could be made with a quick release clamp mechanism, thereby facilitating easy change-out of the sealing elements. The inner housing and the inner housing sleeve are preferably fabricated as separate components since the sleeve may become dented or bent during use of the BOP. Less desirably, the inner housing could include a sleeve integral therewith. The foregoing disclosure and description of the invention are thus illustrative and explanatory of preferred embodiments. Various changes in the structure of the RBOP as well as in the method of operating the RBOP will be made without departing from the scope of the invention, which is defined by [depending] *the pending* claims.

What is claimed is:

1. A rotatable blowout preventer for [use in a hydrocarbon recovery operation] *sealing pressure in a well* including a tubular member passing through the blowout preventer, the rotatable blowout preventer assembly comprising:

a stationary outer housing defining a bore therein for receiving the tubular member, the outer housing have a central axis generally concentric with an axis of the tubular member, and the outer housing including a fluid [closing] *input* port and a fluid output port therein;

an inner housing rotatable within the outer housing [and having an inner curved surface thereon substantially defined by a portion of a sphere having a center substantially adjacent the central axis of the bore];

an annular sealing assembly supported within the inner housing for sealed engagement with the tubular member, [a sealing assembly including a plurality of rigid elements circumferentially arranged about the bore of the outer housing, each rigid element having an outer surface for sliding engagement with the inner curved surface of the inner housing, and] the sealing assembly including a resilient member for sealed engagement with the tubular member;

[a rotatable piston axially movable within the outer housing in response to pressurized fluid in the fluid closing port for causing both axial and radial movement of the annular sealing assembly;]

a lower rotary seal [between the piston and a lower portion of the stationary outer housing] for sealing pressurized fluid within the stationary outer housing from a lower end of the bore in the outer housing;

a flow restriction member [between the rotatable inner housing and an upper portion of the stationary outer housing] for reducing fluid pressure downstream of the flow restriction member to less than 40% of the pressure upstream from the flow restriction member; and an upper rotary seal [between the rotatable inner housing and the upper portion of the stationary outer housing and] downstream from the flow restriction member for sealing the reduced pressure fluid within the outer housing from an upper end of the bore in the outer housing.

2. The rotary blowout preventer as defined in claim 1, further comprising:

an inner housing bearing for rotatably guiding rotation of the inner housing relative to the outer housing, the inner housing bearing being spaced radially outward from the flow restriction member and within a plane perpendicular to the central axis of the bore and inclusive of the flow restriction member.

3. The rotary blowout preventer as defined in claim 1, wherein the flow restriction member is selected from the material consisting of bronze, steel, and ceramic.

4. The rotary blowout preventer as defined in claim 1, further comprising:

a restriction member bearing for guiding rotation of the flow restriction member relative to the inner housing while maintaining a substantially uniform gap between a radially inward surface of the flow restriction member and a radially outward surface of the rotatable inner housing.

5. The rotary blowout preventer as defined in claim 1, further comprising:

the flow restriction member is spaced between a radially outward cylindrical surface of the rotatable inner housing and a radially inward cylindrical surface of the outer housing; and a spacing member for radially spacing the flow restriction member relative to the inner housing to maintain a substantially uniform gap between a radially inward surface of the flow restriction member and the radially outward surface of the rotatable inner housing, such that eccentricity between the inner housing and the outer housing varies a radial spacing between a radially outer surface of the flow restriction member and the radially inward surface of the outer housing.

6. The rotary blowout preventer as defined in claim 1, wherein:

each of the lower rotary seal and the upper rotary seal have a diameter less than 20% greater than a diameter of the bore in the stationary outer housing.

7. The rotary blowout preventer as defined in claim 1, further comprising:

a fluid flow path between the fluid [closing] *input* port and the fluid output port, the fluid flow path passing [by] *fluid to* the lower rotary seal, [radially outward of the piston, radially outward of the rotatable inner housing, past] *then through* the flow restriction member, [past] *then to* the upper rotary seal, and then through the fluid output *port*.

8. The rotary blowout preventer as defined in claim 1, further comprising:

*a rotatable piston axially movable within the outer housing in response to pressurized fluid in the fluid closing port for causing both axial and radial movement of the annular sealing assembly;* a rotatable adapter ring radially outward of the piston;

an upper adapter seal for sealed engagement between the piston and the adapter ring;

a lower adapter seal for sealed engagement between the piston and the adapter ring;

an opening chamber between the piston and the adapter ring and between the upper and lower adapter seals for receiving pressurized fluid from a fluid opening port in the outer housing to move the annular sealing assembly to an open position; and a bearing member for guiding rotation of the adapter ring with respect to the outer housing, the bearing member and the adapter ring each having a metal surface thereon moved into engagement by pressurized fluid in the fluid opening port for substantially restricting fluid flow from the fluid opening port to the fluid closing port.

9. A rotatable blowout preventer system for use in a hydrocarbon recovery operation including a tubular member passing through the blowout preventer, the rotatable blowout preventer system comprising:

a stationary outer housing defining a bore therein for receiving the tubular member, the outer housing having a central axis generally concentric with an axis of the tubular member, and the outer housing including a fluid closing port, a fluid opening port, and a fluid output port therein;

an inner housing rotatable within the outer housing;

an annular sealing assembly supported within the inner housing for sealed engagement with the tubular member;

a pump for generating pressurized hydraulic fluid;

a control valve for selectively controlling flow of the pressurized hydraulic fluid to one of the fluid closing port and fluid opening port;

a rotatable piston axially movable within the outer housing in response to pressurized fluid in the fluid closing port for causing radially inward movement to the annular sealing assembly;

a rotatable adapter ring radially outward of the piston;

an upper adapter seal for sealed engagement between the piston and the adapter ring;

a lower adapter seal for sealed engagement between the piston and the adapter ring;

an opening chamber between the piston and the adapter ring and between the upper and lower seals for receiving pressurized fluid from the fluid opening port to move the piston and the annular sealing assembly to an open position;

a lower rotary seal between the piston and a lower portion of the stationary outer housing for sealing pressurized fluid within the stationary outer housing from a lower end of the bore in the outer housing;

a flow restriction member between the rotatable inner housing and an upper portion of the stationary outer housing for reducing fluid pressure downstream of the flow restriction member; and a upper rotary seal between the rotatable inner housing and the upper portion of the stationary outer housing and downstream from the flow restriction member for sealing the reduced pressure fluid within the outer housing from a upper end of the bore in the outer housing.

10. The rotary blowout preventer system as defined in claim 9, further comprising:

an inner housing bearing for rotatably guiding rotation of the inner housing relative to the outer housing, the inner housing bearing being spaced radially outward from the flow restriction member and within a plane perpendicular to the central axis of the bore and inclusive of the flow restriction member.

11. The rotary blowout preventer system as defined in claim 9, further comprising:

a restriction member bearing for guiding rotation of the flow restriction member relative to the inner housing while maintaining a substantially uniform gap between a radially inward surface of the flow restriction member and a radially outward surface of the rotatable inner housing.

12. The rotary blowout preventer system as defined in claim 9, further comprising:

the flow restriction member is spaced between a radially outward cylindrical surface of the rotatable inner housing and a radially inward cylindrical surface of the outer housing; and a spacing member for radially spacing the flow restriction member relative to the inner housing to maintain a substantially uniform gap between a radially inward surface of the flow restriction member and the radially outward surface of the rotatable inner housing, such that eccentricity between the inner housing and the outer housing varies a radial spacing between a radially outer surface of the flow restriction member and the radially inward surface of the outer housing.

13. The rotary blowout preventer system as defined in claim 9, wherein:

a lower seal cartridge ring for supporting the lower rotary seal thereon;

an upper seal cartridge ring for supporting the upper rotary seal thereon; and each of the lower rotary seal and the upper rotary seal have a diameter less than 20% greater than a diameter of the bore in the stationary outer housing.

14. A rotary blowout preventer system as defined in claim 9, further comprising:

a lower seal cartridge ring for supporting the lower rotary seal thereon, the lower cartridge ring having a passageway therethrough;

an upper seal cartridge ring for supporting the upper rotary seal thereon, the upper cartridge ring having a passageway therethrough; and a fluid flow path between the fluid closing port and the fluid output port, the fluid flow path passing through the passageway in the lower seal cartridge ring, radially outward of the piston, radially outward of the rotatable inner housing, past the flow restriction member, through the passageway in the upper seal cartridge ring, and then through the fluid output port.

15. The rotary blowout preventer system as defined in claim 9, further comprising:

the adapter ring being axially movable in response to fluid pressure in the fluid opening port to substantially restrict fluid flow from the fluid opening port to the fluid closing port.

16. A method of controlling actuation of a rotatable blowout preventer for [for use in a hydrocarbon recovery operation] *sealing pressure in a well* including a tubular member passing through the blowout preventer, the rotatable blowout preventer including a stationary outer housing defining a bore therein for receiving the tubular member, an inner housing rotatable within the outer housing, an annular sealing assembly supported within the inner housing for sealed engagement with the tubular member, [a piston movable within the outer housing for causing radial movement of the annular sealing assembly,] and a fluid [closing] *input* port and a fluid output port in the outer housing for passing pressurized fluid [to the piston] *through the rotatable blowout preventer*, the method comprising:

providing a lower rotary seal [between the piston and a lower portion of the outer housing] for sealing pressurized fluid within the stationary outer housing from a lower end of the bore in the outer housing;

providing a flow restriction [between the rotatable inner housing and an upper portion of the stationary outer housing] for reducing fluid pressure downstream of the flow restriction member to less than 40% of the pressure upstream from the flow restriction; and providing an upper rotary seal [between the rotatable inner housing and an upper portion of the stationary outer housing and] the downstream from the flow restriction for sealing the reduced pressure fluid within the stationary outer housing from an upper end of the bore in the outer housing.

17. The method as defined in claim 16, further comprising:

providing an inner housing bearing for rotatably guiding rotation of the inner housing relative to the outer housing; and spacing the inner housing bearing radially outward from the flow restriction and within a plane inclusive of the flow restriction.

18. The method as defined in claim 16, further comprising:

guiding rotation of the flow restriction relative to the inner housing while maintaining a substantially uniform gap between a radially inward surface of the flow restriction and a radially outward surface of the rotatable inner housing.

19. The method as defined in claim 16, further comprising:

forming a flow path between the fluid [closing] *input* port and the fluid output port, the flow path passing [by] *fluid to* the lower rotary seal, [radially outward of the piston, radially outward of the rotatable inner housing, past] *through* the flow restriction, [past] *to* the upper rotary seal, and then through the fluid output port.

20. The method as defined in claim 16, further comprising:

*providing a piston removable within the outer housing for causing radial movement of the annular sealing assembly;* providing a rotatable adapter ring radially outward of the piston;

providing an upper adapter seal for sealed engagement between the piston and the adapter ring;

providing a lower adapter seal for sealed engagement between the piston and the adapter ring;

forming an opening chamber between the piston and the adapter ring and between the upper and lower adapter seals;

passing pressurized fluid through a fluid opening port in the outer housing to move the piston and the annular packer assembly to an open position; and substantially restricting fluid flow from the fluid opening port to the fluid closing port downstream from the opening chamber.

*21. The rotatable blowout preventer as defined in claim 1;*

*the inner housing having an inner curved surface thereon substantially defined by a portion of a sphere having a center substantially adjacent the central axis of the bore; and*

*the annular sealing assembly includes that plurality of rigid elements circumferentially arranged about the bore of the outer housing, each rigid element having an outer surface of a sliding engagement with the inner curved surface of the inner housing.*

*22. The rotary blowout preventer as defined in claim 21, further comprising:*

*a rotatable piston axially moveable within the outer housing in response to pressurized fluid for causing both axially and radially movement of the annular sealing assembly.*

*23. The rotary blowout preventer as defined in claim 22, wherein the lower rotary seal acts between the piston and a lower portion of the stationary outer housing.*

*24. The sealing assembly as defined in claim 1, wherein the upper rotary seal is positioned between the rotatable inner housing and an upper portion of the stationary outer housing.*

*25. The rotary blowout preventer as defined in claim 1, wherein the flow restriction member is spaced between a cylindrical surface on the stationary upper housing and another cylindrical surface on the rotatable inner housing.*

*26. The rotary blowout preventer as defined in claim 1, wherein an inner surface of the annular sealing preventer is configured for closing off flow of fluid through the annular sealing assembly when no tubular member passes through the blowout preventer.*

*27. The method as defined in claim 16, wherein the upper rotary seal is spaced between the rotary inner housing and an upper portion of the stationary outer housing.*

*28. The method as defined in claim 16, further comprising:*

*positioning the flow restriction between the cylindrical surface on the stationary upper housing and another cylindrical surface on the rotary inner housing.*

*29. The method as defined in claim 16, further comprising:*

*closing the annular inner sealing assembly to prevent fluid from passing therethrough when the tubular member does not pass through the blowout preventer.*

* * * * *